March 24, 1959 W. SHOCKLEY 2,879,189

METHOD FOR GROWING JUNCTION SEMI-CONDUCTIVE DEVICES

Filed Nov. 21, 1956 4 Sheets-Sheet 1

INVENTOR.
William Shockley
BY
Flehr & Swain
ATTORNEYS

METHOD FOR GROWING JUNCTION SEMI-CONDUCTIVE DEVICES

Filed Nov. 21, 1956 4 Sheets-Sheet 2

INVENTOR.
William Shockley
BY
Flehr & Swain
ATTORNEYS

FIG. 9
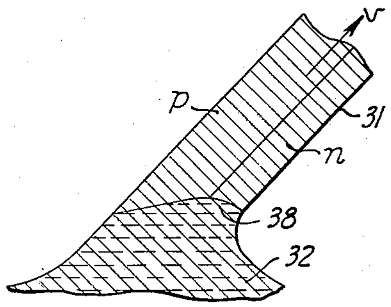
FIG. 10
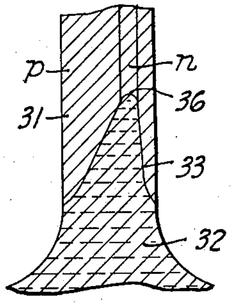
FIG. 13
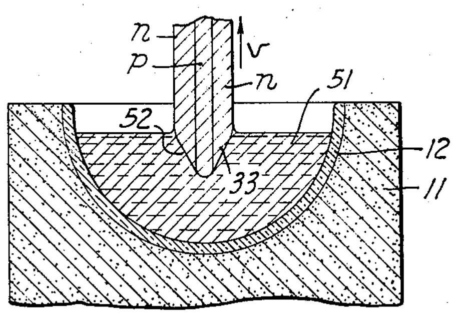
FIG. 14
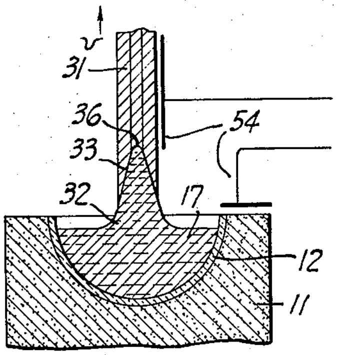
FIG. 15
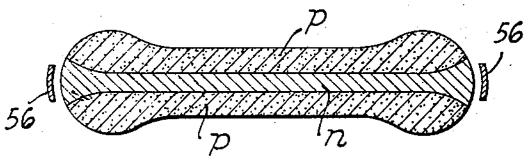
FIG. 19
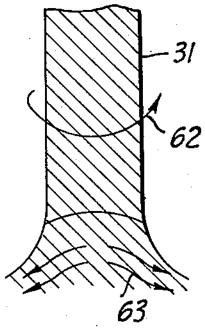
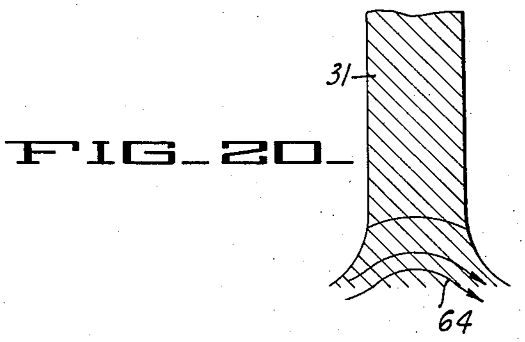
INVENTOR.
William Shockley
BY
Flehr & Swain
ATTORNEYS

METHOD FOR GROWING JUNCTION SEMI-CONDUCTIVE DEVICES

Filed Nov. 21, 1956 4 Sheets-Sheet 4

INVENTOR.
William Shockley
BY
Flehr & Swain
ATTORNEYS

United States Patent Office 2,879,189

Patented Mar. 24, 1959

2,879,189

METHOD FOR GROWING JUNCTION SEMI-CONDUCTIVE DEVICES

William Shockley, Los Altos, Calif.

Application November 21, 1956, Serial No. 623,586

10 Claims. (Cl. 148—1.5)

This invention relates generally to a method and apparatus for growing junction semi-conductive devices, and more particularly to a method and apparatus for growing junction semi-conductive devices directly from a melt of semi-conductive material.

In my copending application entitled "Crystal Growing Method and Apparatus," filed October 29, 1956, Serial No. 618,899, there is described a method and apparatus for growing or pulling a crystal of semi-conductive material having a predetermined cross sectional area and contour from a melt of the same. Generally, this is achieved by controlling the heat exchange to the crystal growing region. For example, the crystal is pulled through a heat exchange means having a predetermined contour and cross sectional area. The crystal may be formed with regions which are mechanically weaker than others whereby wafers of semi-conductive material suitable for forming semi-conductive devices may be formed by mechanically stressing the grown crystal. The wafers are then employed in subsequent processes to form semi-conductive devices.

It is a general object of the present invention to provide a method and apparatus in which junction semi-conductive devices are grown from a melt of semi-conductive material.

It is a further object of the present invention to provide a method and apparatus in which junction semi-conductive devices are grown from a homogeneous melt by employing rate growing techniques.

It is another object of the present invention to provide a method and apparatus in which semi-conductive devices are grown from a homogeneous melt by controlling the diffusion of impurities away from the region of the solid-liquid interface.

It is another object of the present invention to provide a crystal growing method and apparatus in which curved solid-liquid interfaces are formed and the growing or pulling rate is controlled whereby a device having longitudinally extending junctions is formed.

It is a further object of the present invention to provide a crystal growing method and apparatus in which rate growing techniques are employed with a curved solid-liquid interface to grow a junction semi-conductive device directly from a melt with the device having regions of different conductivity types transversely of the same.

These and other objects of the invention will become more clearly apparent from the following description read in conjunction with the accompanying drawings.

Referring to the drawings:

Figure 9 is a sectional view showing a crystal being withdrawn at an angle with respect to the horizontal and the solid-liquid interface associated therewith;

Figure 10 is a sectional view showing an unsymmetrical reentrant solid-liquid interface;

Figure 13 is a sectional view showing a protruding solid-liquid interface;

Figure 14 shows another means for obtaining a reentrant solid-liquid interface;

Figure 15 shows a cross sectional view of a device which may be grown by heating predetermined edges of the growing crystal;

Figure 19 illustrates the flow of fluid away from the solid-liquid interface when the crystal is rotated as it is grown;

Figure 20 shows the flow of liquid past the solid-liquid interface when the liquid is caused to pass the same by paddles or the like.

Figures 1, 2:
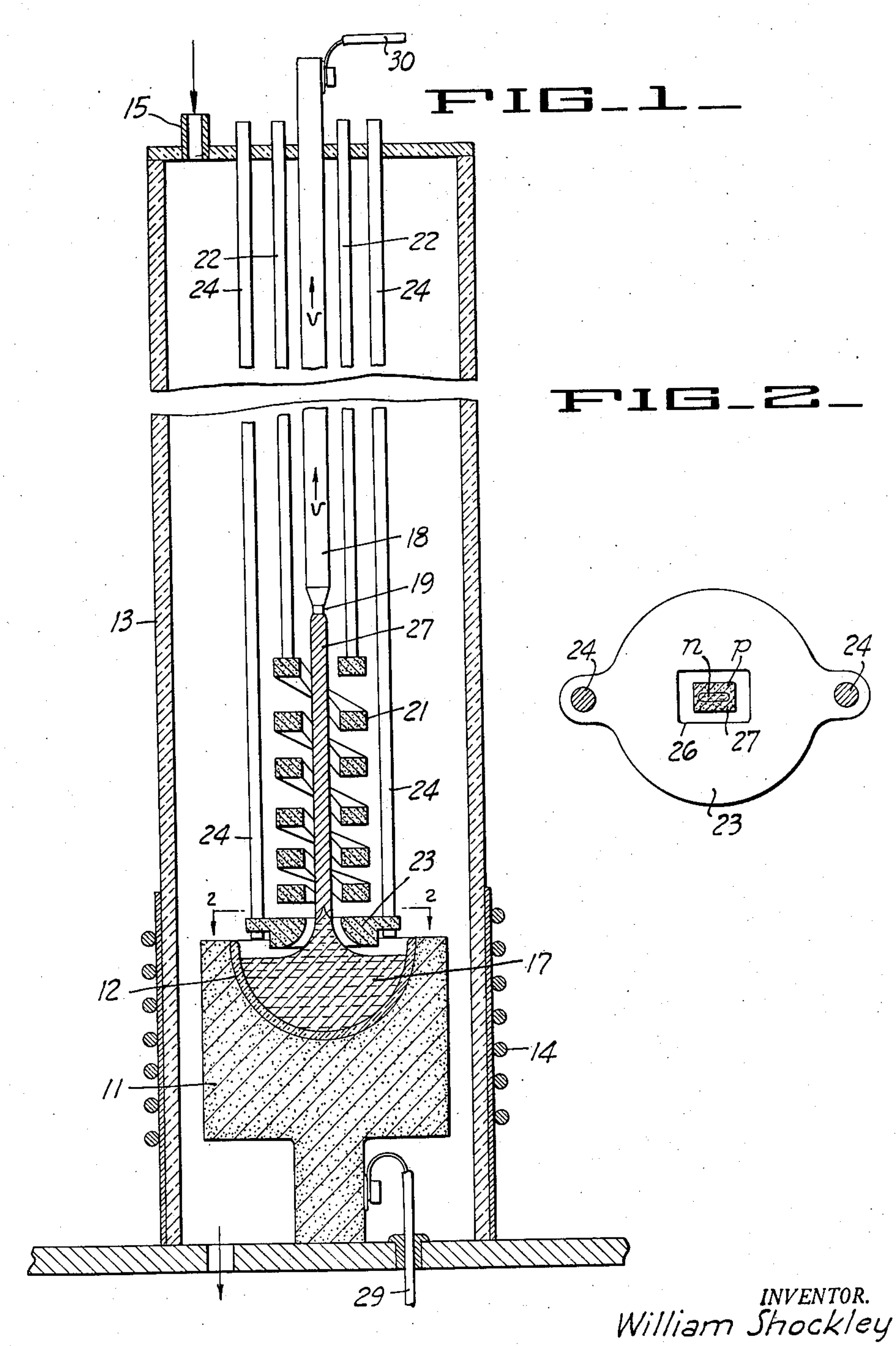
Figure 1 is a schematic diagram showing suitable apparatus for carrying out the invention.
Figure 2 is a sectional view taken along the line 2—2 of Figure 1.

The so-called rate-grown junction process is based on the fact that most impurities in a semi-conductive material prefer to remain in the liquid phase rather than freeze into the solid phase. Stated another way, the impurities at the solid-liquid interface tend to diffuse into the liquid phase. As is well known, this same tendency is employed in the zone purification of semi-conductive crystals.

The extent to which most impurities are soluble (present in the solid) depends on the rate at which the crystal grows during the pulling process and upon the rate of diffusion of the impurities into the liquid phase. The more rapid the pulling process, the less the impurities have a chance to be rejected into the liquid phase and thus more impurities are captured in the solid phase. The greater the diffusion constant, the greater the rate of growth before a given percentage of impuriites is captured in the solid phase. As is generally known in the art, see for example the articles in the Journal of Chemical Physics, vol. 21, pages 1987–1996, November 1953, by J. A. Burton and others, the degree to which the impurities escape being incorporated in the solid depends quantitatively on the amount of stirring and other factors, some of which will be presently described.

An important quantity in the theory is the diffusion length, defined as $L=D/v$; where D is the diffusion constant for the impurity concerned and $v$ is the velocity of growth. Impurities that are rejected tend to accumulate in a layer approximately L thick. Evidently if considerable stirring occurs within a distance L of the surface, the accumulation will be substantially reduced and the amount of impurity incorporated in the solid will be relatively small. On the other hand, if L is small compared to the depth of stirring and the dimensions of the crystal, then the impurities will be unable to escape. Negligible purification will occur and the impurity content of the growing crystal will be the same as that of the melt.

There are some impurities, notably boron in both germanium and silicon, which are not strongly rejected by the solid. These are relatively immune to the effect of rate of growth.

The foregoing characteristics are utilized in making alternate p-type and n-type regions in the rate-grown technique. When the crystal growth rate is small the solubility in solid is small, i.e., most of the impurities at the solid-liquid interface diffuse into the liquid phase. However, the impurities which are independent of the rate of growth remain in the solid state. Generally, these types of impurities are p-type whereby the solid region formed is of the p-type. By increasing the rate of growth, the diffusion length L is reduced and less impurities find their way into the liquid phase. These impurities are generally n-type impurities and thus when the rate of growth is increased the solid region formed is of the n-type. If the crystal is rotated as it is pulled from the melt, the liquid in the crystal growing region is placed in motion and the ease of escape is increased. By varying the rate of withdrawal of a crystal from a homogeneous melt, p-type and n-type regions are formed. In the prior art the junctions are formed with their plane generally perpendicular to the longitudinal axis of the growing crystal. Subsequent to the growth process the crystals are sliced and diced to form semi-conductive junction devices.

Evidence has also been obtained by R. N. Hall, Journal of Physical Chemistry Symposium on Impurity Phenomena, June 16–18, 1953, that the concentration of impurities entering the crystal depends not only on the growth velocity but also on the crystal orientation of the solid-liquid interface. This effect can be combined with those discussed below to produce or enhance the desired concentration differences.

As described in the said copending application, crystals of predetermined cross sectional area and contour may be grown from a homogeneous melt by effecting a heat transfer in the crystal growing region.

The present invention contemplates the use of the teaching of said copending application together with the control of one or more of the following: growth rate, rotation of the crystal, shape of the solid-liquid interface, crystallographic orientation of the solid-liquid interface, and concentration of carriers in the melt to grow a crystal which has longitudinal regions of different conductivity type whereby junctions are formed which run longitudinally of the same. The grown crystal may then be cut up to form semi-conductive junction devices. A more detailed analysis will be hereinafter presented.

By employing a curved solid-liquid interface having a radius of curvature comparable to $L=D/v$, where $v$ is the rate of growth, D is the diffusion constant, and L is the diffusion length, impurities which are rejected into the liquid from the solid tend to concentrate at the apex of the solid-liquid interface and are trapped in the solid phase which grows in this region. As a consequence, the longitudinal central region or core of the crystal is formed of one conductivity type while the outside regions are formed of a different conductivity type, as will be presently described.

Referring now to Figure 1, a crystal growing apparatus suitable for carrying out the invention is illustrated. The apparatus comprises a graphite crucible 11 which may be lined with a quartz liner 12. The crucible is disposed within a quartz chimney 13. Surrounding the chimney and the crucible is an induction heater 14 which serves to heat the crucible. An inert atmosphere is provided by circulating gas through the chimney, as indicated at 15. The homogeneous melt of semi-conductive material 17 is disposed within the crucible. A rod 18 which is suitably supported and which is adapted to move upwardly at the velocity $v$ is inserted downwardly through the chimney 13. A seed 19 is carried at the lower end of the rod and is dipped into the homogeneous melt. The rod is then withdrawn and the crystal grows on the seed as it is withdrawn from the melt. A graphite member 21 which may be in the form of a double helix surrounds the grown crystal and is heated by means of current through the leads 22. The turns of the helix are spaced so that there is temperature gradient between the bottom of member 21 and the top whereby the bottom portion is at a temperature near the melting point of the semi-conductive material while the upper region is cooler. This tends to reduce the thermal gradients along the grown crystal and to thereby provide a grown device having improved characteristics.

A second member 23 encircles the crystal in the crystal growing region. This member is heated by means of current through the leads 24. The member 23 serves to provide heat to the crystal growing region. The opening in the members 21 and 23 has a predetermined size and contour whereby the device which is grown will be grown having a predetermined cross sectional area and contour, as described in the said copending application.

Basically, this consists of effecting a heat exchange with the crystal growing region to control the size of the grown crystal. For example, the opening may be rectangular as shown at 26 in which event a rectangular crystal 27 will be grown. It is apparent, of course, that crystals having any predetermined size and contour may be grown.

As will be presently described, the crystal grown in accordance with the present invention will have a central core of one conductivity type, for example, n-type (Figure 2) with the surrounding portions of opposite conductivity type, for example, p-type. Means are provided for applying a longitudinal heating current to the crystal. For example, a suitable voltage is applied between the lines 29 and 30. This causes a suitable current to flow through the crystal, the current flowing through the rod 18, crystal 27, pool 17 and crucible 11. The current may be applied directly to the crystal by means of graphite rollers or brushes, or through surface melting contacts described below. As will be presently described, the current serves to heat the center of the growing device to a higher temperature than the outside portion. A re-entrant solid-liquid interface is thus formed.

Figure 3:
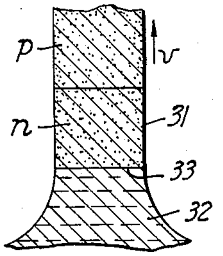
Figure 3 is a sectional view illustrating a plane solid-liquid interface.

Referring to Figure 3, a semi-conductive device 31 is shown being withdrawn from a melt 32 employing conventional rate growing techniques. The solid-liquid interface 33 is substantially a plane. The device shown is being grown by varying the rate as previously described. Thus, regions of different conductivity types forming junctions which run perpendicular to the longitudinal axis of the grown crystal are shown.

Figure 4:
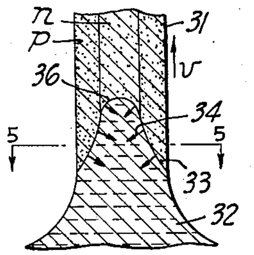
Figure 4 is a sectional view illustrating a reentrant solid-liquid interface.
Figure 5:
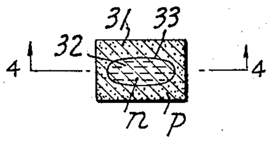
Figure 5 is a sectional view taken along the line 5—5 of Figure 4.

Referring to Figures 4 and 5, the solid-liquid interface 33 is re-entrant into the crystal. A solid-liquid interface of this type may be formed by supplying heat to the center of the crystal as, for example, by passing an electric current through the crystal. The center of the crystal will remain hotter than the outside portions because heat transfer from the outside portions is greater than from the core. As the crystal is pulled from the melt, which has predetermined impurities, certain of the impurities are rejected as indicated by the arrows 34. It is apparent that the impurities tend to concentrate in the central region of the crystal near the apex 36 of the solid-liquid interface. Thus, as the crystal is grown, more impurities find their way into the central region of the solid phase. Thus, an inner region or core of one conductivity type is formed, as shown in cross section in Figure 5, with a region of opposite conductivity type surrounding the core.

Figure 6:
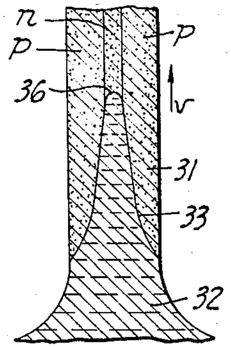
Figure 6 is a sectional view illustrating another reentrant solid-liquid interface which is more pronounced.

By forming a more sharply re-entrant solid-liquid interface region, as illustrated in Figure 6, more impurities are collected in the central region to form a device with a central region having increased carrier concentration.

Figure 8:
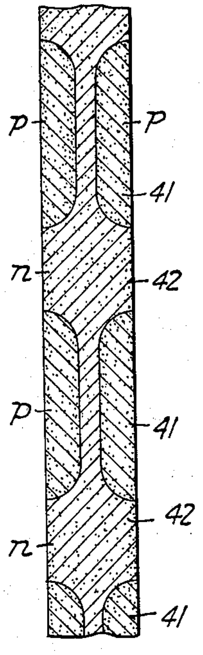
Figures 7 and 8 show devices which may be grown with a combination of solid-liquid interfaces of the types illustrated in Figures 3–6.
Figure 7:
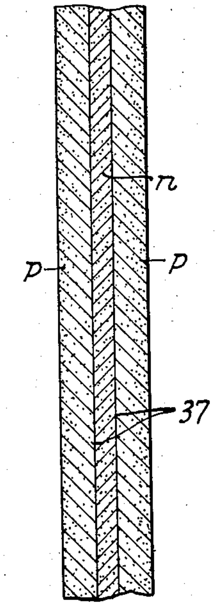

Referring to Figure 7, a junction semi-conductive device grown as described with a fixed rate of withdrawal is illustrated. The device has a longitudinal junction 37. A device of the character shown in Figure 8 may be grown by varying the longitudinal current flowing through the crystal whereby the central region is heated for a portion of the time to form a re-entrant solid-liquid interface and then the current is cut off to form a plane interface. When there is a curved solid-liquid interface, a core 41 of different conductivity type is formed. When the current is cut off and the solid-liquid interface is plane, regions 42 of one conductivity type are formed. The device may then be broken up in the manner previously described to form a plurality of semi-conductive junction devices. It is apparent that to grow a device having uniform concentration, material having the average carrier concentration of the material which grows into the crystal should be continuously added.

In certain instances it is desirable to form a single junction semi-conductive device. Such a device may be constructed in accordance with the teachings of Figures 9 and 10. If the growing crystal is withdrawn at an angle with respect to the surface of the molten bath, then impurities tend to collect in the region 38. The impurities then are trapped in the solid and form a region of one conductivity type along one edge of the sample.

Figure 12:
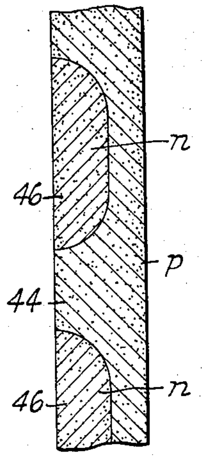
Figures 11 and 12 show devices which may be grown with the solid-liquid interfaces shown in Figures 9 and 10.
Figure 11:
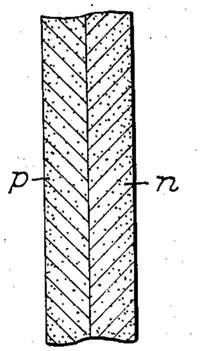

In Figure 10 another method is illustrated. Heat may be supplied to the side of the growing device. This forms an unsymmetric re-entrant solid-liquid interface. With enough curvature, the grown junction will have adjacent regions of the type shown in Figures 11 and 12. The Figure 11 shows two regions having a longitudinal junction. The crystal of Figure 12 may be grown as shown in Figure 9 by withdrawing the crystal perpendicular to the surface of the melt for a portion of the time to grow the regions 44 and then at an angle to grow regions 46. The same regions 44 and 46 may be formed in the case of the structure shown in Figure 10 by varying the current to form a flat solid-liquid interface for a portion of the time.

Figure 13 illustrates a protruding solid-liquid interface. An interface of this type may be formed by having a melt 51 which is super-cooled. It may also be produced by applying sufficient cooling to the sides of the crystal above the solid-liquid interface on the surface. The impurities then tend to concentrate in the region 52. The outer portion will be of one conductivity type while the central region is of the other type. However, for the same melt as previously described, the core and surrounding regions will be reversed in conductivity type.

The center of the crystal may be heated by other means. For example, the crystal may be made the current path in a U.H.F. or microwave circuit, the coupling to it being then entirely capacitive. Referring to Figure 14, capacitive coupling 54 is shown inducing current flow down the crystal into the melt.

Referring to Figure 15 which is a sectional view additional heaters may be supplied at the ends of a rectangular crystal to extend the liquid phase to the edges of the crystal. Thus, heaters 56 are shown adjacent to the ends and which serve to heat the edge portions. The liquid phase then extends to the edges. The central region of different conductivity type extends across the device. Further, by applying more heat, the edge portions may be wider to thereby increase the voltage the device may withstand without breakdown. Also, less leakage will result and the channel effect will be considerably reduced. Alternatively, the heaters may actually touch the crystal, for example they may be of graphite in the case of germanium, or silicon carbide in the case of silicon. In this event they may act as electrodes for passing the heating current down to the melt.

A more complete consideration of the effect of the growth rate, impurity concentration in the melt, shape of the solid-liquid interface and velocity of the liquid phase at the solid-liquid interface is helpful. An exact design theory can be worked through for any particular geometry of the advancing solid-liquid interface. However, the results are complicated and difficult to visualize.

As a first example of the importance of growth rate in respect to concentration, consider a crystal of circular cross-section of radius $r_0$. Suppose that the solid-liquid interface is approximately a hemisphere of radius $r_0$ extending into the melt. Then if no stirring occurs, a good approximation to the flow in the liquid is $$v_r = -a/r^2$$

where $r$ is the distance from the center of the hemisphere, $v_r$ is the radial velocity of flow and $2\pi a$ is the volume of liquid solidified per unit time. Following the notation of the cited reference, vol. 21, p. 1987 of the Journal of Chemical Physics, the continuity equation for the steady state in polar coordinates is $$0 = \text{div}\,(CV - D \text{ grad } C)$$

$$= -D\frac{d^2C}{dr^2} - \left[\frac{a}{Dr^2} + \frac{2}{r}\right]\frac{dC}{dr}$$

The solution of this equation for C, the concentration of the impurity in the liquid is $$C = A \exp\,(a/Dr) + B$$

deep in the melt the boundary condition is $$C_L = A + B$$

where $C_L$ is the concentration in the homogeneous region of the liquid. Setting up the boundary condition at $r_0$, we obtain for $k$, the ratio of concentration in the crystal to that deep in the liquid, the expression $$k = \frac{k^* \exp\,(r_0/L)}{1 - k^* + k^* \exp\,(r_0/L)}$$

where $k^*$ is the ratio at the interface and L is a diffusion length defined by $$L = D/(a/r_0^2) = D/v_0$$

where $v_0$ is the growth velocity on the surface of the sphere and L is the corresponding diffusion length. It is seen that as L becomes much greater than $r_0$, $k$ approaches $k^*$ showing that no pile up of impurity occurs. On the other hand, if the growth rate is high, L is small and the exp $(r_0/L)$ is large and $k$ approaches unity, showing that a concentration builds up. This shows that the effect of rate growing can be achieved without stirring the melt provided that the diffusion length L and the size of the crystal $r_0$ are in the proper proportion.

Actually, there will be a shape effect in the case just considered because at the solid-liquid interface the growth velocity varies over the surface of the hemisphere.

Figure 16:
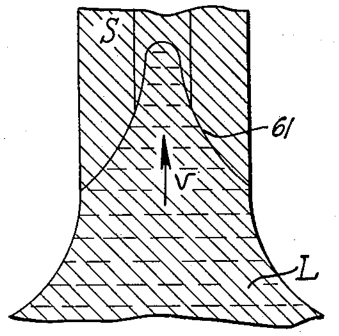
Figure 16 is a schematic diagram showing a crystal having a reentrant solid-liquid interface.
Figure 17:
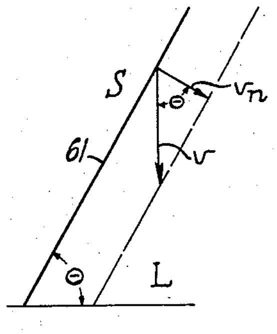
Figure 17 is an enlarged view showing the velocity vectors associated with the crystal of Figure 16.

A better appreciation of the various factors involved in the effect of surface liquid interface shape may be had by considering the simplified example illustrated in Figures 16–20. Referring to Figure 16, the liquid phase L is represented as flowing upward towards the solid-liquid interface 61 with a velocity of $v$. Figure 17 shows an enlarged view of a portion of the solid-liquid interface 61 of Figure 16. The liquid phase L is below the interface and the solid phase S above. To simplify the mathematics, a suitable coordinate system may be selected, as will be presently described. Assume that the solid is advancing into the liquid with a normal velocity $v_n$, where $$v_n = v \cos\theta$$

$\theta$ is the angle between the normal to the interface in the liquid phase. $v$ is the vertical velocity.

Considering the case of growth into the liquid phase with a velocity $v_n$. Then as dicussed, for example, in the articles by Burton et al., Journal of Chemical Physics, vol. 21, pages 1987–1996, November 1953, the differential equation governing the flow is $$D\frac{d^2C}{dz^2}-v_n\frac{dC}{dz}=0$$

where D is the diffusion constant for the impurity in the melt, C the concentration, and $z$ the distance from the solid-liquid interface.

The boundary condition at the interface is $$(C_0-C_s)v_n+D\frac{dC}{dz}=0$$

The solution to this boundary value problem is then $$C(z)=C_L\left(\frac{1}{k^*}-1\right)\exp\left(\frac{-z}{L_n}\right)+C_L$$

where $k^*$ is the ratio of concentration of impurity between the solid and liquid phases under the growth conditions, and $C_L$ is the concentration in the liquid. The length $L_n$ is the diffusion length appropriate to the velocity $v_n$ $$L_n=D/v_n=L/v\cos\theta$$

This equation applies to the case where there is no stirring and shows that the impurities tend to accumulate in front of the growing interface. When the impurities are sufficiently concentrated, they will freeze out into the solid with concentration $C_L$. The depth of the accumulation layer is approximately given by $L_n$. For typical values of diffusion constant and growth rate quoted in the references, $L_n$ will be in the order of $10^{-2}$ centimeters.

If the diffusion length $L_n$ is relatively short compared to the width of the crystal of Figure 16, then over most of the hypothetical interface the conditions will be substantially uniform. There will be two concentrated layers as indicated by the dotted lines 66, Figure 18. In this figure the coordinate axis $x$ and $y$ are shown.

$$z=x\cos\theta+y\sin\theta$$

and $$C(z)=C_L\left(\frac{1}{k^*}-1\right)\exp\left[\frac{(-x\cos\theta-y\sin\theta)\cos\theta}{L}\right]+C_L$$

Corresponding to this distribution of impurities, there is a flow across the $x$ axis given by $$-D(\partial C/\partial y)=C_L\left(\frac{1}{k^*}-1\right)\frac{\sin\theta\cos\theta}{L}\exp\left(\frac{-x\cos\theta}{L}\right)$$

Figure 18:
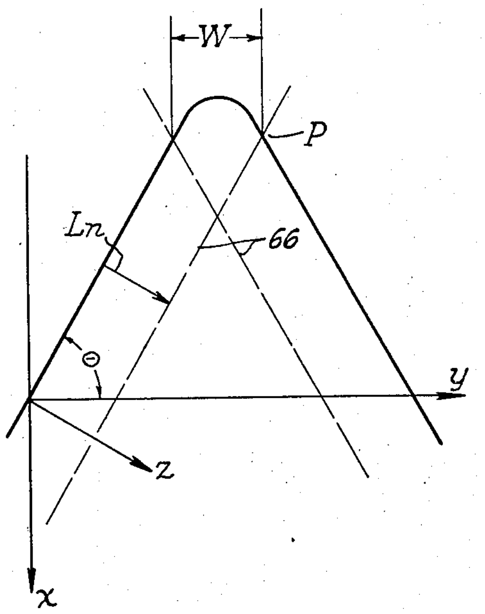
Figure 18 is an enlarged view of a portion of a reentrant solid-liquid interface of Figure 16.

This results in a total flow of $$F=\int^{\infty}-D(\partial C/\partial y)dx=DC_L\left(\frac{1}{k^*}-1\right)\tan\theta$$

per unit depth into the plane of Figure 18. In other words, the growing crystal tends to reject impurities having $k^*$ less than unit y and to push these towards the center of Figure 18.

The impurities rejected from the left side of Figure 18 to a depth $L_n$ will impinge on the right side at point P. They will thus tend to become trapped in a strip of width W, where $$W=L_n/\sin\theta=L/\sin\theta\cos\theta$$

from which they cannot diffuse away. Hence, the material solidifying in this strip at a rate of $Wv$ units of volume per unit length per unit time must consume a net inward flow 2F of rejected impurities.

The concentration in the solid will thus be given by $$C_x(\text{in } W)=2F/Wv$$

$$=2C_L\left(\frac{1}{k^*}-1\right)\sin^2\theta$$

It should be noted that this formula is a valid approximation only if $L_n$ is small compared to the dimensions of the crystal. It does show, however, that very large increases of concentration can be achieved with reentrant growth interfaces. For example, with arsenic and antimony in germanium, $1/k^*$ is about 30 and 300 respectively. Thus, large concentrations can occur even for relatively small values of $\theta$.

As an illustration, consider a crystal which is being grown from a melt that is being stirred. In this case, distribution co-efficient is dependent upon the rate of growth. For example, as described in the reference, the amount of antimony incorporated in the crystal can be more than tripled by increasing the rate of growth. On the other hand, boron is more soluble in the solid phase than in the liquid phase and its concentration is decreased slightly by increasing the rate of growth.

Figure 21:
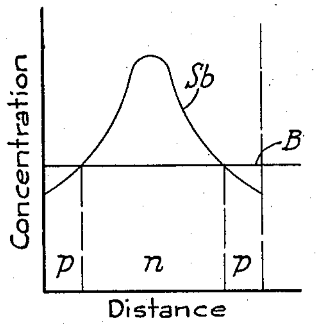
Figures 21–23 show curves of concentration as a function of distance across the same for devices grown from melts including antimony and boron under various growth rates and curvatures of the solid-liquid interface.
Figure 22:
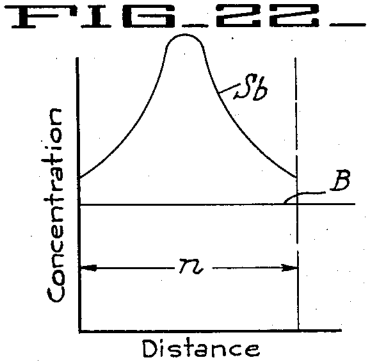
Figure 23:
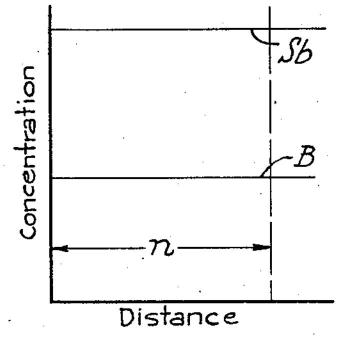

In Figures 21–23, the concentration of antimony and boron for a crystal grown from a melt containing approximately 100 times more antimony than boron atoms is represented. At very slow rates of growth so that stirring is completely effective, the crystal grows with portions which are p-type, Figure 21. For very fast rates, the antimony distribution constant increases and the crystal grows as n-type, Figure 22. In both cases the effect of the curved solid-liquid interface is shown. Figure 23 represents the effect of reducing the curvature of the surface as well as increasing the rate of growth as compared to Figure 21.

If a crystal is grown as in Figure 21 with growing of the type illustrated in Figures 22 and 23 alternated therewith, then it is evident that a crystal with a p-n-p structure is grown. The crystal will be of the type shown in Figure 8. This device may then be cut at the regions 42 to make individual semi-conductive devices.

It is apparent that motion of the liquid past the interface may be obtained in many ways. For example, as described in the references and illustrated in Figure 19, the crystal may be rotated 62 whereby a centrifugal action is effected at the solid-liquid interface to move the liquid away from the solid-liquid interface as indicated by the arrow 63. It may also be controlled without stirring by changing the rate of growth so that L is alternately large and small compared to the thickness of the crystal.

The effect of inserting a paddle into the liquid and stirring the same is illustrated in Figure 20. The arrows 64 indicate the flow of liquid past the solid-liquid interface. The same effect may also be achieved by growing the crystal off center of the crucible and rotating the crucible whereby the liquid flows past the solid-liquid interface.

I claim:

1. The method of growing a semiconductive crystal having at least one p-n junction from a melt of semiconductive material including impurity atoms which comprises drawing the crystal from the melt, controlling the heat at the crystal growing region to form a curved solid-liquid interface having a radius of curvature such that impurity atoms rejected by the solid concentrate in a region adjacent said solid-liquid interface and are trapped in the crystal as it is grown from the melt to form a longitudinal region in said crystal of a conductivity type corresponding to said impurity atoms.

2. The method of growing a semiconductive crystal having at least one p-n junction from a melt of semiconductive material including impurity atoms which comprises pulling the crystal from the melt, forming a solid-liquid interface with a radius of curvature comparable to the diffusion length of said impurity atoms, whereby atoms rejected by the solid are concentrated in a region adjacent said solid liquid interface and are trapped by the crystal as it is pulled from the melt to form a crystal having a longitudinal region of a conductivity type dependent upon the impurity atoms.

3. The method of growing a semiconductive crystal having at least one p-n junction from a melt of semiconductive material including impurity atoms which comprises the steps of pulling a crystal from the melt, controlling the heat at the crystal growing region to form a solid-liquid interface with a radius of curvature comparable to $D/v$ where D is the diffusion constant in the melt for the impurity atoms and $v$ is the rate of growth whereby impurity atoms rejected by the solid concentrate in a region adjacent the solid-liquid interface and are trapped in the crystal as it is grown from the melt to form a crystal having a longitudinal region of a conductivity type corresponding to the impurity atoms.

4. The method of growing a semiconductive crystal having at least one p-n junction from a melt of semiconductive material including impurity atoms which comprises drawing the crystals from the melt at a predetermined rate, controlling the heat at the crystal growing region to form a curved solid-liquid interface having a radius of curvature such that the impurity atoms rejected by the solid concentrate in a region adjacent the apex of said solid-liquid interface and are trapped in the crystal as it is grown from the melt to form a crystal having longitudinal regions of a conductivity type characterized by the impurity atoms, and periodically changing the heat at the crystal growing region to form a relatively flat interface whereby the crystal grown during this period of time does not include a longitudinal region.

5. The method of growing a semiconductive crystal having at least one p-n junction from a melt of semiconductive material including impurity atoms which comprises the steps of drawing the crystals from the melt, controlling the heat at the crystal growing region to form a curved solid-liquid interface having a radius of curvature such that impurity atoms ejected by the solid concentrate in a region adjacent said solid-liquid interface are trapped in the crystal as it is grown from the melt to form a crystal having longitudinal regions of a conductivity type dependent upon the impurity, and continuously adding to the melt material having an impurity concentration equal to the concentration of the material being drawn therefrom.

6. The method of growing a semiconductive crystal having at least one longitudinal p-n junction from a melt of semiconductive material including impurity atoms which comprises forming a homogeneous melt of semiconductive material including said impurity atoms, pulling a crystal from the melt at a predetermined rate whereby impurity atoms rejected by the solid are concentrated in the liquid adjacent a region of the solid-liquid interface, controlling the heat at the solid-liquid interface to form a curved solid-liquid interface, said concentrated impurities solidifying a region of the solid to produce at least one longitudinal p-n junction in the grain crystal.

7. The method of growing a semiconductive crystal having at least one p-n junction from a melt of semiconductive material including impurity atoms which includes the steps of controlling the heat at the solid-liquid interface to form a curved solid-liquid interface which extends along the length of the crystal, pulling the crystal from the melt at a predetermined rate whereby impurity atoms rejected by the solid are concentrated in a region adjacent the apex of the solid-liquid interface and are trapped in the solid phase as the device is drawn from the melt to form a crystal having at least one longitudinal p-n junction.

8. The method of growing semiconductive crystals having at least one p-n junction from a melt of semiconductive material including impurity atoms which comprises the step of pulling the crystal from the melt, controlling the heat at the crystal growing region to alternately form curved solid-liquid interfaces having a radius of curvature such that impurity atoms rejected by the solid concentrate in a region adjacent the solid-liquid interface and are trapped in the crystal as it is grown from the melt and a relatively flat solid-liquid interface whereby impurity atoms rejected by the solid are not trapped adjacent the solid-liquid interface, said crystal being grown with alternate lengths including longitudinal p-n junctions of a conductivity type dependent upon the impurity atoms.

9. The method of growing a semiconductive crystal having at least one p-n junction from a melt of semiconductive material including impurity atoms which comprises forming a curved solid-liquid interface which extends to the side edge of the device and which has a radius of curvature such that impurity atoms rejected by the solid concentrate in the apex of said solid-liquid interface, drawing the crystal at such a rate that the impurity atoms are trapped in the crystal as it is grown from the melt to form a crystal having longitudinal regions of a conductivity type dependent upon said impurity atoms.

10. The method of growing a semiconductive crystal having at least one p-n junction from a melt of semiconductive material including impurity atoms which comprises drawing the crystals from the melt at a predetermined rate, simultaneously rotating the crystal, controlling the heat of the crystal at the growing region to form a curved solid-liquid interface having a radius of curvature such that impurity atoms rejected by the solid concentrate in the region adjacent said solid-liquid interface and are trapped in the crystal as it is grown from the melt to form a crystal having longitudinal regions of a conductivity type dependent upon the impurity atoms.

References Cited in the file of this patent

UNITED STATES PATENTS

| | | |
|---|---|---|
| 2,214,976 | Stockbarger | Sept. 17, 1940 |
| 2,631,356 | Sparks et al. | Mar. 17, 1953 |
| 2,674,520 | Sobek | Apr. 6, 1954 |
| 2,703,296 | Teal | Mar. 1, 1955 |
| 2,730,470 | Shockley | Jan. 10, 1956 |
| 2,783,168 | Schweickert | Feb. 26, 1957 |
| 2,789,039 | Jensen | Apr. 16, 1957 |

FOREIGN PATENTS

| | | |
|---|---|---|
| 753,160 | Great Britain | June 18, 1956 |
| 1,127,036 | France | Dec. 6, 1956 |